Oct. 2, 1951          H. C. GIBSON          2,570,031
FROZEN CONFECTION AND METHOD OF MAKING THE SAME
Filed Aug. 29, 1949          2 Sheets-Sheet 1
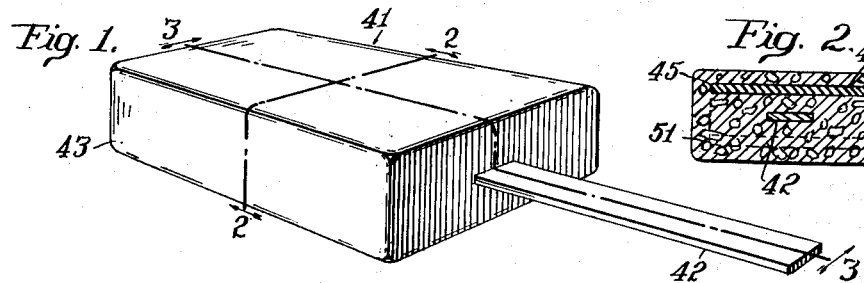
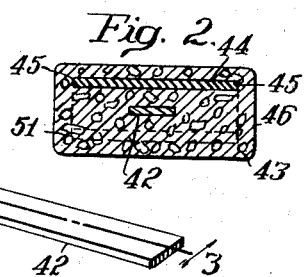
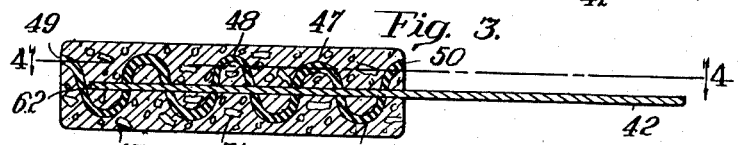
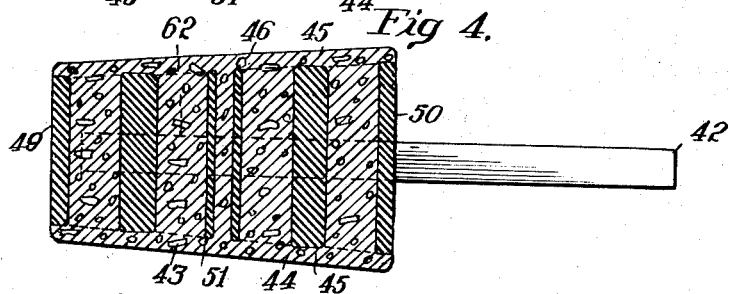
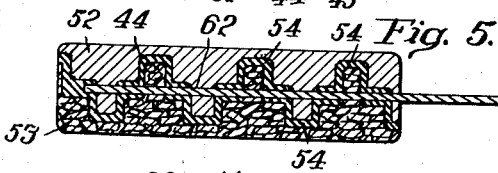
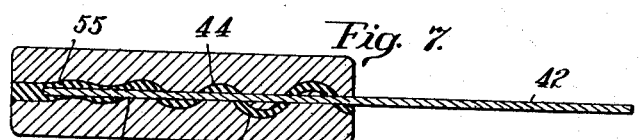
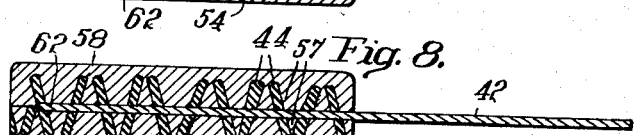
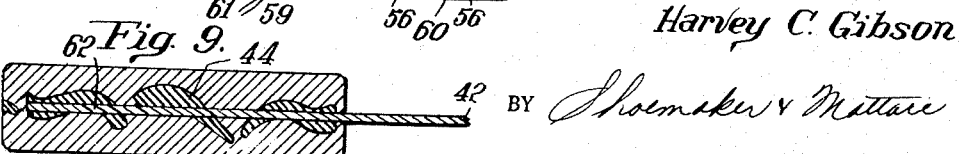
INVENTOR
Harvey C. Gibson
BY Shoemaker & Mattare
ATTORNEYS Oct. 2, 1951   H. C. GIBSON   2,570,031
FROZEN CONFECTION AND METHOD OF MAKING THE SAME
Filed Aug. 29, 1949   2 Sheets-Sheet 2
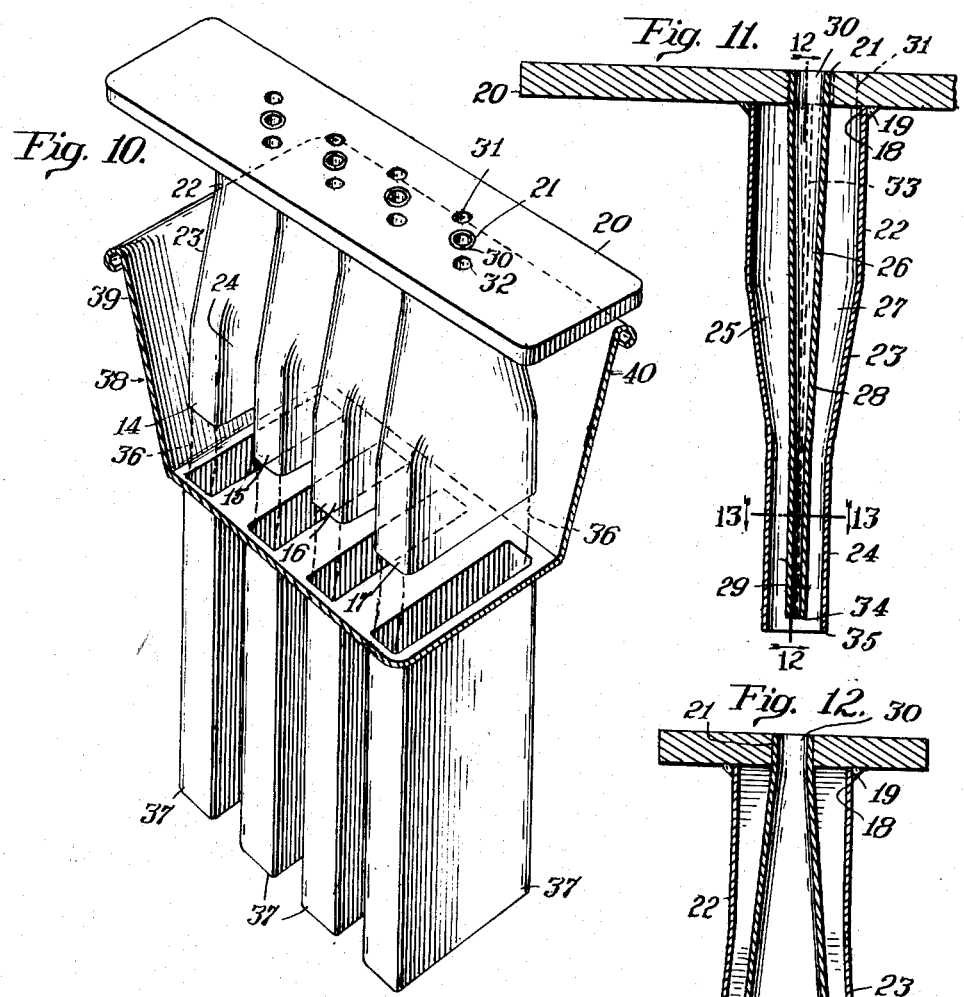
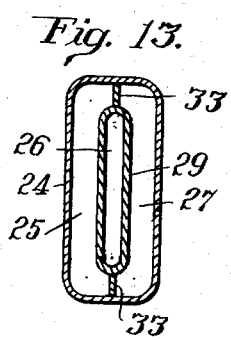
INVENTOR
Harvey C. Gibson
BY
Shoemaker & Mattau
ATTORNEYS Patented Oct. 2, 1951

2,570,031

UNITED STATES PATENT OFFICE 2,570,031

FROZEN CONFECTION AND METHOD OF MAKING THE SAME

Harvey C. Gibson, Lancaster, Pa.

Application August 29, 1949, Serial No. 112,967

7 Claims. (Cl. 99—137)

This invention relates to confections.

The invention is more particularly directed to frozen composite confections. I have termed my invention a "Sundae-on-a-Stick."

So-called sundaes are usually made up of one or more scoops of bulk ice cream and a dressing or syrup of most any flavor is poured over the ice cream which is in a suitable dish, and, of course, nuts, marshmallow and fruits may be added to the sundae. Such sundaes are dispensed in drug stores, soda bars, etc.

In my invention, I embody the so-called Sundae-on-a-Stick in a frozen condition on a stick and thus may sundaes on sticks may be purchased at soda bars, drug stores, etc. and from attendants of refrigerated mobile vehicles. My Sundae-on-a-Stick is equally as palatable as the sundae prepared and dispensed at the soda bar or drug store and yet may be handled and eaten without any undue stickiness or melting or dripping of the same, notwithstanding the fact that the sundae may contain two or more different flavors of ice cream, combinations of ice cream or frozen custards and fruit, fruit-ices, sherbet or fudge, etc., all of which have embodied therewith the dressing and, in some instances, nuts and fruit and the like are also embodied in the article.

In making a Sundae-on-a-Stick in accordance with my invention, the completed article is necessarily a composite one. This composite sundae, if consisting of a layer of fruit and a layer of ice cream with a layer of the dressing encased between the two first said layers, with the stick extending into the article between the said layers, must necessarily be so prepared, including proper stabilization of the fruit product, so that numerous of said articles can be readily frozen and the frozen state maintained, and the stick firmly affixed to the article.

I have found that a composite confection, in accordance with my invention, consisting of a layer of frozen friut, fruit-ice, sherbet or fudge, and a layer of ice cream or frozen custard with the dressing disposed in the article between the two layers is adaptable for ready freezing and that the final frozen article will maintain a substantial frozen state during the complete course of the eating process.

In order to further improve the texture and provide greater palatability of the ice cream and fruit composite confection, I have also found that, in order that the fruit is essentially of the same texture and melt down as that of the ice cream, it is necessary to stabilize the same with a colloidal or a composite of colloidals such as gelatin, pectin, locust bean gum (gum arabic), etc., which usually requires twice the amount required for stabilizing ice cream. For an antioxidant and retaining freshness in the product, gum oat is used. After incorporation of the stabilizer with the fruit, it is then semi-frozen in the same manner as the ice cream prior to disposal through the nozzles into the molds. In semi-freezing the stabilized fruit, an over-run is developed therein which further improves texture and palatability; this, of course, includes the incorporation of air in the mix, and this over-run is generally from 75% to 100%. Thus, with a 100% over-run, a gallon of fruit (or ice cream) weighs only about four and one-half pounds. However, the over-run is often varied and the weight is accordingly varied in like proportion. Such fruits as will not comminute under the action of the mechanical freezer, must be comminuted prior to semi-freezing.

The dressing, which is in the center of my composite frozen article, is of flexuous or wavy-like formation. I have discovered that in dispensing the three component ingredients constituting my composite confection through nozzles that, due to the viscosity, state and/or degree of semi-freeze, and over-run, all varying from time to time, this is what causes the phenomena of the varying flexuous or wavy-like disposition of the center of the composite confection, which is the dressing or the like. I have found that, in dispensing the several component ingredients from a single nozzle to a mold, the composite discharged from the nozzle or nozzles to the mold pockets flows from the nozzles in an undulating or undulated stream or body to the mold or molds and thus the flexuous or wavy-like or marbleized disposition of the dressing within the composite article is obtained.

With the above in mind, it is an object of my invention to provide a relatively inexpensive and practicably dispensable frozen confection simulating a so-called sundae.

A further object of my invention is to provide a relatively inexpensive and practicably dispensable frozen confection simulating a so-called sundae, and wherein the confection is mounted on a stick.

Another object of my invention is to provide a novel composite confection wherein two or more flavors of ice cream, sherbet, frozen custard, etc. with an inner layer or core of flexuous formation and constituting a dressing or syrup, is substantially enclosed within the confection.

Another object of my invention is to provide a novel composite confection wherein two or more flavors of ice cream, sherbet, frozen custard, etc. with an inner layer of flexuous formation and constituting a dressing or syrup, is substantially enclosed within the confection and wherein the confection is mounted on a stick.

Another object of my invention is to provide a novel composite confection wherein the undulations of inner layer or core define pockets or spaces filled with portions of the ice cream, or equivalent material, forming the body of the confection, the stick having its embedded portion passing through the core and gripped thereby so the stick will be firmly anchored in the confection.

A further object of my invention is to provide a frozen confection wherein several composite layers of different flavored ice cream or the like are superposed and enclosed between the same a frozen dressing.

Another object of my invention is to provide a frozen confection wherein the dressing is contained within the same in a frozen condition and one or more different flavored layers of ice cream are utilized and wherein one of these layers may be frozen fruit or the like, or frozen fruit, nuts or the like may be distributed throughout the body of the frozen confection.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a perspective view of the frozen confection;

Fig. 2 is a transverse sectional view taken substantially along the line 2—2 of Fig. 1;

Fig. 3 is a longitudinal sectional view taken substantially on the line 3—3 of Fig. 1;

Fig. 4 is a longitudinal sectional view taken along the line 4—4 of Fig. 3;

Figs. 5, 6, 7, 8 and 9 are longitudinal sectional views showing various modifications of the invention;

Fig. 10 is a perspective view partly in section, showing the filling of the confection into the molds from nozzles;

Fig. 11 is a vertical sectional view of one of the nozzles shown in Fig. 10;

Fig. 12 is a vertical sectional view of the nozzle shown in Fig. 11, but in a different position from that in Fig. 11; and Fig. 13 is a transverse sectional view substantially on the line 13—13 of Fig. 11, looking in the direction of the arrow.

The invention will be more readily understood by referring to the drawings in detail, wherein like numerals in the several figures of the drawings all denote the same parts.

It is believed that the invention will be more clearly understood by first referring briefly to the manner in which the frozen confection is made. In Fig. 10 of the drawings there is disclosed a plurality of spaced dispensing nozzles 14, 15, 16 and 17, each of which nozzles, at its upper end 18, is butt welded as at 19 to the under side of the distributor or header plate 20 adjacent and surrounding an opening 21 therein. All of the nozzles are similarly formed so a description of one will suffice. The nozzles are elongated and have a substantially cylindrical upper portion 22 which merges into a slightly tapered portion 23 and this tapered portion merges into a flattened end discharge portion 24. Each nozzle includes three separate and distinct passageways or vents 25, 26, 27. The inner vent or passageway 26 is formed by a tubular one-piece member which is flattened and tapers and flares as at 28 and this tapered portion merges into a flattened discharge end 29 which is substantially of the same shape but of less cross sectional dimension and length than the flattened end 24 of the nozzle. The inner passageway or vent 26 is reduced at its upper end 30 and this upper end is positioned and maintained in the opening 21 of the header or distributor plate 20. Openings 31 and 32 connect, respectively, with passageways 25 and 27. The header or distributor plate 20 is operably associated with a suitable hopper or container, not shown, which container is partitioned so as to allow three different ingredients that constitute the frozen confection to flow into the separate passageways 25, 26 and 27. The inner vent or passageway 26 is provided at its opposite sides with preferably integral webs 33 which contact and may be secured to portions of the inner walls of the outer nozzle member and thus provide for the three separate and distinct passageways 25, 26 and 27, see Fig. 13.

It will be noted that the extreme end 34 of the inner vent or nozzle member is positioned slightly inwardly of the extreme end 35 of the outer nozzle member. However, the length of this member may be changed at will. The semi-solid and flowing body of the composite confection indicated at 36 in Fig. 10 flows downwardly from the open ends of the aforesaid nozzles directly above suitable freezing molds 37 and which molds depend from a pan-like upper portion 38, which includes enclosing side, front and back walls, two of which walls 39 and 40 only being shown in the diagrammatic illustration in Fig. 10. As seen in Fig. 10, the semi-solid composite confection flows from the nozzles to the molds in an undulated form, this being caused by the viscosity, semi-freeze and over-run in varying degree in the material and which results in the hereinafter described flexuous or wavy-like disposition of the dressing which is enclosed within the composite confection as frozen.

My composite confection is shown in Figs. 1 through 9. In the modification of the invention as disclosed in Figs. 1 through 4, the confection consists of a frozen bar or body indicated generally at 41, the stick being denoted at 42. The bar or body of the confection is of less width and thickness than the length thereof, the usual length of the article being about four or five inches and about an inch thick and about two inches wide and tapering from one end to the other. The size and configuration of the frozen confection, however, is optional and depends, of course, upon the amount of material used and the size and shape of the mold as to its final configuration and size.

The bar or body of the confection 41 may consist of ice cream denoted at 43 and in Figs. 1 through 4 the ice cream may all be of one flavor, say vanilla, and within this bar or body of ice cream there is disposed in a sinuous or wavy-like formation the dressing, such as chocolate syrup, fruit or the like 44. This dressing or core in its wavy-like formation or disposition in the frozen article is disposed in an irregular condition and extends inwardly as at 45 from the outer side edges 46 of the confection, see Fig. 2. The undulations of the dressing vary in thickness, as will be seen in Fig. 3, wherein one undulation 47 is rather thick whereas the next undulation 48 is rather thin and this phenomena I have found is effected in the confections that I have manufactured, but nonetheless, it will be seen that the dressing is so positioned within the confection that no matter where the bite is taken, and this is true with regard to the hereinafter mentioned modifications of my invention, the individual eating the confection will in each bite have ice cream and some of the dressing so that the individual will have the effect of actually eating a sundae such as dispensed in soda bars and the like. The ends 49 and 50 of the dressing within the frozen confection extend to the respective ends of the frozen confection and may or may not have fruits or nuts, indicated at 51, therein. It will also be apparent, in the drawing, that a composite of ice cream and fruit provides alternating bites of the ice cream and fruit, and in so eating the flavor of each material is intensified. Thus, further improving palatability. Furthermore, one or more flavors of fruit may be provided with an ice-cream center as a center dressing.

The center dressing may, in order that all materials utilized be of the same weight and texture, be semi-frozen with an over-run developed therein of approximately the same degree as the ice cream and other materials.

To prevent or retard possible "bleeding" out of the center dressing into the superposed materials, said dressing may be stabilized with colloidals or composites thereof, such as: gum arabic, pectin, gelatin, etc.

For faster whipping, glyceryl monostearate is utilized at approximately 0.1%.

Fruit acids work well with some fruits for blending and emphasizing flavor, 0.1% to 0.15% usually being sufficient.

In Fig. 5 the frozen confection consists of superposed layers of ice cream, frozen custard or the like denoted at 52, and a suitable comminuted fruit or the like 53, with the dressing or core 44 enclosed within the frozen confection and of such formation that this dressing has portions thereof that project into each of the bodies of ice cream or the like 52 and fruit 53 and form a sort of interlocking relationship therewith. I have found that, in molding and freezing some of the confections, the dressing assumes the outline as disclosed in Fig. 5, it being understood that this dressing extends substantially to the sides of the frozen confection, the same as in the modification of the invention shown in Fig. 1. In Fig. 5, the dressing consists of rectangularly shaped hollow pockets 54, which pockets are disposed in the two different layers of the confection 52 and 53 and thus serve to hold the two superposed layers more firmly together in their frozen state.

In the modification of the confection shown in Fig. 6, which is similar to the invention as disclosed in Figs. 1 through 4, the sinuous or wavy-like formation of the dressing 44 is closer together, as regards the ridges and valleys than in Figs. 1 through 4. In molding some of the frozen confections, I have found that the wavy-like or flexuous disposition of the dressing 44 in the ice cream body assumes the form as shown in Fig. 7, wherein the undulations or ridges and valleys 54 are farther apart than in the aforementioned modifications of the invention, and adjacent the end 55 the dressing is substantially straight, as it were.

I have still further found that in molding and freezing the confections, the dressing 44, as shown in Fig. 8, is disposed within the frozen confection in substantially V-shaped formation, indicated at 56, and thus providing between these V-shaped formations pockets or spaces 57 into which the ice cream and/or frozen fruit or the like in two different layers 58 and 59 is disposed and frozen and thus firmly held together in their composite relationship. In Fig. 8 it will be noted that some of the V-shaped dressing formations are actually connected and contact at the point of the V, as indicated at 60, whereas other of these V-shaped formations, as indicated at 61, are unconnected and out of contact but all of the said formations may be unconnected.

Further, in Fig. 9, the dressing 44 disposed within the frozen article, as in the aforementioned figures of the drawings, assumes a marbleized effect in that there are several distinct and unconnected dressing ingredients disposed in the frozen body of the confection to produce the marbleized effect.

In all of the modifications of my invention, and as is clearly seen in the figures of the drawings 1 through 9, the stick 42 projects a considerable distance into the body or bar of the frozen confection and in all instances that portion of the stick 62 which is embedded in the body of the confection passes through several of the wavy-like or flexuous formations of the dressing 44. Thus, the embedded portion of the stick is firmly held by the frozen confection.

From the foregoing it is clear that I have provided a novel frozen confection which lends itself to many combinations of different flavored ice creams, sherbets, frozen custards etc., along with the dressing which is embedded in the frozen confection, and thus I provide in fact a frozen sundae on a stick so that the individual eating the same will have all the benefits of a sundae as ordinarily and usually prepared and yet there will be no inconvenience such as stickiness or running of any portion of the frozen confection, and in every bite by the individual the ice cream or ice cream and fruit or whatever the combination may be, will be accompanied by a portion of the dressing.

The sundae dressing which is disposed between two bodies of ice cream or a body of ice cream and fruit, as the case may be, is provided with more sugar or other sweetening and thus has a much lower freezing point. It is, therefore, necessary that a proper stabilizer be utilized.

This confection may be provided with a coating or covering to prevent stickiness in handling and eating. Due to the abundance of flavors provided by the composite members, a costly coating such as chocolate and the like containing cocoa butter or vegetable oils used in some frozen stick confections is not necessary. A sugar-water coating is recommended instead. Two pounds sugar to ten gallons water provides a transparent film which is highly desirable. Furthermore, cups or other suitable containers may be used, having provided in their bottoms, tops or lids, apertures providing passageways for the sticks to be inserted therethrough and by which the contents are pushed or pulled from the receptacle.

The right is reserved to fill family size desert packages for home use. These packs are filled by using one or more larger or wider three-vent nozzles instead of four as shown in the drawings.

The stabilizers used would preferably be locust bean gum (gum arabic), pectin and gelatin, and, if used singly, preferred in the order listed. However, locust bean gum and pectin together are desirable. It requires approximately twice as much to stabilize fruit as ice cream. Therefore, taken in the order listed above, about .35% to .4%; .45% to .6% and .65% to .75% respectively. Oat gum, which is an anti-oxidant and also a stabilizer and which is helpful in retaining freshness, is desirable. It is of about the potency of gelatin and, when used, its stabilizing effectiveness must be taken into consideration. Other stabilizers may, of course, be used.

The center dressings, above referred to, is somewhat sweeter than the outside composite material and, in a good many instances, it is considerably sweeter and consequently freezing of the dressing might cause some trouble. Therefore, due to the undulations, the top dressings or centers are held between the composite outer material such as ice cream and fruit or ice cream and fudge, etc. If the center dressing were disposed in a straight line within the outer materials difficulty might be experienced in firmly holding or embedding the portion of the stick in the confection as the stick would then be disposed properly solely in the center dressing within the confection. Due to the undulations or wavy-like formation, it will, therefore, be seen that a portion of the stick passes through the outer materials which are frozen and sealed thereto and which, of course, holds the stick substantially in the bar or body. I desire it understood that a tart product may be used for dressings, if desired.

I claim:

1. A frozen composite confection comprising a body consisting of at least two substantially similarly formed layers of frozen material merging into each other, an intermediate core of congealed material, which material is different than the material of both of said layers and is of less width than the body and extends longitudinally therein and is enclosed between the layers, and a stick extending into said body through one end thereof and passing through and gripped by the said core.

2. A frozen composite confection comprising a body formed of frozen material and including side and end faces, a core of congealed material of less width than said body extending longitudinally therein and having portions extending transversely of the body in opposite directions and defining spaces open at their ends and each open along one side, alternate spaces having their open sides presented toward opposite sides of the body, said body enclosing the core and having portions extending into said spaces, and a stick extending longitudinally in said body through one end thereof and passing through the pockets and the portions of the core defining the pockets and gripped by the portions of the core through which it passes.

3. A frozen composite confection comprising a body consisting of layers of frozen material merging with each other, and a core of congealed material of less width than the body extending longitudinally therein between the said layers and having portions extending transversely of the body in opposite directions and defining spaces open at their ends and each open along one side, the open sides of alternate spaces being presented in opposite directions, the layers forming the body having portions entering and filling the said spaces, and a stick embedded for a portion of its length in the body with portions passing through the space-forming portions of the said strip.

4. A frozen composite confection comprising a body consisting of layers of ice cream merging into each other, and a continuous strip of congealed dressing of less width than the body extending longitudinally therein between the layers of ice cream in spaced relation to opposite side edges thereof and formed with undulations defining spaces between the undulations open along their sides and having their open sides alternately presented toward opposite side portions of the body, the said layers of ice cream having portions extending into and filling the spaces, and a stick extending into said body through one end thereof and passing through and gripped by the undulations of the strip.

5. The process of forming a composite confection comprising separately simultaneously feeding at least two similarly formed semi-solid layers of material and a semi-solid intermediate core of less width than said layers into a mold, merging the layers in the mold with the core extending longitudinally of the layers and enclosed therebetween, placing a stick in the mold with a portion thereof extending into the core of the confection, freezing the confection in the mold, and removing the frozen confection on the stick from the mold.

6. The process of forming a composite confection comprising simultaneously feeding masses of ice cream and an intermediate strip of semi-fluid dressing into a mold with the said strip of dressing located between the masses of ice cream, the dressing having a sinuous form and defining pockets filled with portions of the layers of ice cream, a stick being disposed longitudinally in the confection and passing through and gripped by undulations of the strip, and all of the ingredients being united by freezing.

7. The process of forming a composite confection comprising feeding semi-fluid ice cream forming material into a mold together with a semi-fluid dressing spaced from margins of the ice cream material, the said dressing being in the form of a strip and having undulations imparted to it to form transverse pockets open along outer sides and filled with the ice cream material, disposing a stick longitudinally in the mold with portions passing through the undulations of the dressing, and freezing the assembled ice cream material and dressing and thereby forming a solid block in which the stick is anchored by gripping action of the frozen dressing.

HARVEY C. GIBSON.

REFERENCES CITED

The following references are of record in the file of this patent:

UNITED STATES PATENTS

| Number | Name | Date |
| --- | --- | --- |
| 1,855,145 | Jones | Apr. 19, 1932 |
| 1,968,183 | Vogt | July 31, 1934 |
| 1,968,732 | Anagnos | July 31, 1934 |
| 2,085,495 | Fulkerson | June 29, 1937 |
| 2,217,700 | Musher | Oct. 15, 1940 |
| 2,289,326 | Howser | July 7, 1942 |